United States Patent
Franzi

(10) Patent No.: US 11,621,956 B2
(45) Date of Patent: Apr. 4, 2023

(54) METHOD FOR SECURELY CONNECTING A WATCH TO A REMOTE SERVER

(71) Applicant: Tissot SA, Le Locle (CH)

(72) Inventor: Edoardo Franzi, Cheseaux-Noréaz (CH)

(73) Assignee: Tissot SA, Le Locle (CH)

( * ) Notice: Subject to any disclaimer, the term of this patent is extended or adjusted under 35 U.S.C. 154(b) by 57 days.

(21) Appl. No.: 17/083,927

(22) Filed: Oct. 29, 2020

(65) Prior Publication Data

US 2021/0176241 A1   Jun. 10, 2021

(30) Foreign Application Priority Data

Dec. 6, 2019   (EP) ..................................... 19214192

(51) Int. Cl.
*H04L 9/40* (2022.01)
*H04W 12/06* (2021.01)
(Continued)

(52) U.S. Cl.
CPC ....... *H04L 63/0861* (2013.01); *G04G 21/025* (2013.01); *G04G 21/04* (2013.01);
(Continued)

(58) Field of Classification Search
None
See application file for complete search history.

(56) References Cited

U.S. PATENT DOCUMENTS

| 4,224,948 A | * | 9/1980 | Cramer | A61B 5/02438 |
| | | | | 968/844 |
| 7,519,198 B2 | * | 4/2009 | Endoh | G06F 21/83 |
| | | | | 340/5.83 |

(Continued)

FOREIGN PATENT DOCUMENTS

| JP | 2010-522379 A | 7/2010 |
| JP | 2016-110368 A | 6/2016 |

(Continued)

OTHER PUBLICATIONS

Lee "Implicit Sensor-based Authentication of Smartphone Users with Smartwatch," 2016, ACM, pp. 1-8 (Year: 2016).*

(Continued)

*Primary Examiner* — Luu T Pham
*Assistant Examiner* — James J Wilcox
(74) *Attorney, Agent, or Firm* — Oblon, McClelland, Maier & Neustadt, L.L.P.

(57) ABSTRACT

A method for securely connecting a watch to a remote server of a service provider including the following steps: authenticating the wearer of the watch authorizing access to use the functions of this watch, and selecting one of the functions from an input interface of the watch aiming at establishing a connection between the watch and the remote server; identifying the wearer of the watch from at least one biometric information element included in a portion of this wearer's skin; transmitting to the remote server an authentication element relating to the selected function once the wearer is identified, and carrying out an authentication of the wearer by the remote server from the authentication element in order to authorize an exchange of data between the watch and this remote server.

6 Claims, 1 Drawing Sheet

(51) Int. Cl.
  *G04G 21/04* (2013.01)
  *G06F 21/32* (2013.01)
  *G04G 21/02* (2010.01)
  *H04W 12/33* (2021.01)
  *H04L 67/141* (2022.01)

(52) U.S. Cl.
  CPC ............ *G06F 21/32* (2013.01); *H04W 12/06* (2013.01); *H04L 67/141* (2013.01); *H04W 12/33* (2021.01)

(56) References Cited

U.S. PATENT DOCUMENTS

| | | | |
|---|---|---|---|
| 10,075,846 B1 | 9/2018 | Acar et al. | |
| 10,460,187 B2* | 10/2019 | Oda | G06F 16/583 |
| 10,627,783 B2* | 4/2020 | Rothkopf | A61B 5/0205 |
| 11,120,112 B1* | 9/2021 | Chen | G06F 21/33 |
| 11,263,301 B2* | 3/2022 | Yang | G06V 10/145 |
| 11,284,252 B2* | 3/2022 | Kim | G01S 19/01 |
| 2001/0056243 A1* | 12/2001 | Ohsaki | G04G 21/025 |
| | | | 600/503 |
| 2003/0037264 A1 | 2/2003 | Ezaki et al. | |
| 2003/0163710 A1* | 8/2003 | Ortiz | H04L 63/0861 |
| | | | 713/186 |
| 2006/0034492 A1* | 2/2006 | Siegel | G06F 21/32 |
| | | | 382/115 |
| 2006/0291701 A1* | 12/2006 | Tanaka | G06V 40/30 |
| | | | 340/5.2 |
| 2011/0102137 A1* | 5/2011 | Schroter | A61B 5/1072 |
| | | | 340/5.52 |
| 2012/0138680 A1* | 6/2012 | Litz | G06F 21/32 |
| | | | 340/5.82 |
| 2012/0144204 A1* | 6/2012 | Litz | H04L 63/0861 |
| | | | 713/186 |
| 2012/0159599 A1* | 6/2012 | Szoke | G06F 21/35 |
| | | | 726/7 |
| 2013/0219480 A1* | 8/2013 | Bud | G06F 21/32 |
| | | | 726/7 |
| 2013/0269013 A1* | 10/2013 | Parry | H04L 63/0861 |
| | | | 726/7 |
| 2014/0121539 A1* | 5/2014 | Chatterjee | A61B 5/681 |
| | | | 600/479 |
| 2014/0162598 A1* | 6/2014 | Villa-Real | H04M 1/66 |
| | | | 455/411 |
| 2014/0189854 A1* | 7/2014 | Younkin | G06T 7/90 |
| | | | 726/19 |
| 2014/0196131 A1* | 7/2014 | Lee | G06F 21/32 |
| | | | 726/5 |
| 2014/0283013 A1* | 9/2014 | Marco | G06F 21/32 |
| | | | 726/19 |
| 2015/0015365 A1* | 1/2015 | Ortiz | G07C 9/25 |
| | | | 340/5.52 |
| 2015/0046990 A1* | 2/2015 | Oberheide | G06F 21/45 |
| | | | 726/5 |
| 2015/0063661 A1* | 3/2015 | Lee | H04L 63/0861 |
| | | | 382/124 |
| 2015/0112260 A1* | 4/2015 | David | A61B 5/015 |
| | | | 604/116 |
| 2015/0146944 A1* | 5/2015 | Pi | H04L 63/0861 |
| | | | 382/124 |
| 2015/0172287 A1* | 6/2015 | Ortiz | H04L 63/0861 |
| | | | 726/7 |
| 2015/0186720 A1* | 7/2015 | Tsou | G06F 3/013 |
| | | | 348/78 |
| 2015/0220109 A1* | 8/2015 | von Badinski | A61B 5/1118 |
| | | | 368/10 |
| 2015/0242605 A1* | 8/2015 | Du | H04W 12/065 |
| | | | 726/7 |
| 2015/0254471 A1* | 9/2015 | You | G06F 21/6245 |
| | | | 726/19 |
| 2015/0304322 A1* | 10/2015 | Zaidi | G06V 40/70 |
| | | | 382/115 |
| 2015/0355604 A1* | 12/2015 | Fraser | G01J 1/0437 |
| | | | 368/10 |
| 2015/0371028 A1* | 12/2015 | Patel | G06F 21/32 |
| | | | 726/16 |
| 2016/0048672 A1* | 2/2016 | Lux | A61B 5/02444 |
| | | | 340/5.82 |
| 2016/0117563 A1* | 4/2016 | Shin | G06V 40/10 |
| | | | 382/115 |
| 2016/0142402 A1 | 5/2016 | Kim | |
| 2016/0154952 A1* | 6/2016 | Venkatraman | G06Q 20/40145 |
| | | | 726/19 |
| 2016/0166936 A1* | 6/2016 | Millegan | G06F 21/35 |
| | | | 463/29 |
| 2016/0308859 A1* | 10/2016 | Barry | G06V 40/172 |
| 2017/0017785 A1* | 1/2017 | Rice | H04N 5/23232 |
| 2017/0032168 A1* | 2/2017 | Kim | H04L 63/0861 |
| 2017/0048652 A1* | 2/2017 | Del Rio | H04L 63/0861 |
| 2017/0048707 A1* | 2/2017 | Ortiz | H04W 12/06 |
| 2017/0309162 A1* | 10/2017 | Oberholzer | G08C 17/00 |
| 2017/0316419 A1* | 11/2017 | Laporta | G06Q 20/3276 |
| 2018/0005005 A1* | 1/2018 | He | G06F 3/0418 |
| 2018/0060683 A1* | 3/2018 | Kontsevich | H04L 63/0861 |
| 2018/0082474 A1* | 3/2018 | Vaughn | H04W 12/062 |
| 2018/0192946 A1* | 7/2018 | Adachi | A61B 5/022 |
| 2018/0239976 A1* | 8/2018 | Cornelius | H04W 12/33 |
| 2018/0260602 A1* | 9/2018 | He | A61B 5/14542 |
| 2018/0268233 A1* | 9/2018 | Langley | G06V 40/172 |
| 2019/0080153 A1* | 3/2019 | Kalscheur | G06V 40/166 |
| 2019/0095602 A1* | 3/2019 | Setlak | G06F 1/1686 |
| 2019/0207932 A1* | 7/2019 | Bud | G06F 21/32 |
| 2019/0236330 A1 | 8/2019 | Miyoshino et al. | |
| 2019/0295543 A1 | 9/2019 | Wu et al. | |
| 2019/0303551 A1* | 10/2019 | Tussy | H04W 12/065 |
| 2019/0342756 A1* | 11/2019 | Ortiz | H04L 63/0853 |
| 2019/0349367 A1* | 11/2019 | Chang | G06F 1/163 |
| 2019/0386988 A1* | 12/2019 | Segura Perales | A61B 5/117 |
| 2020/0004943 A1* | 1/2020 | Gu | H04W 12/63 |
| 2020/0069200 A1* | 3/2020 | Wang | A61B 5/02438 |
| 2020/0153624 A1* | 5/2020 | Wentz | H04L 9/0866 |
| 2020/0229761 A1* | 7/2020 | Pandya | G04G 21/025 |
| 2020/0272717 A1* | 8/2020 | Figueredo de Santana | H04L 63/0861 |
| 2020/0272721 A1 | 8/2020 | Sato | |
| 2020/0280852 A1* | 9/2020 | Ortiz | H04L 63/0861 |
| 2020/0327302 A1* | 10/2020 | He | G06F 3/0412 |
| 2020/0374283 A1* | 11/2020 | Rakshit | H04L 63/0861 |
| 2020/0395421 A1* | 12/2020 | He | G06F 21/32 |
| 2020/0405233 A1* | 12/2020 | Sakkalis | G04G 21/025 |
| 2021/0049252 A1* | 2/2021 | Ando | G01S 17/18 |
| 2021/0173352 A1* | 6/2021 | Franzi | G06F 21/629 |
| 2021/0173912 A1* | 6/2021 | Franzi | G04G 21/025 |
| 2021/0334567 A1* | 10/2021 | Tasar | G06F 3/015 |
| 2022/0004617 A1* | 1/2022 | Irwin, III | G06F 21/40 |
| 2022/0012318 A1* | 1/2022 | Battle | H04L 63/0876 |
| 2022/0079519 A1* | 3/2022 | Jirik | A61B 5/742 |
| 2022/0172392 A1* | 6/2022 | Michalsky | G06T 7/73 |

FOREIGN PATENT DOCUMENTS

| | | | | |
|---|---|---|---|---|
| JP | 2016110368 A | * | 6/2016 | ............ G06F 1/163 |
| JP | 2017-27594 A | | 2/2017 | |
| JP | 2017027594 A | * | 2/2017 | ............ G06F 1/163 |
| JP | WO2018079852 A1 | * | 10/2017 | ............ G06F 1/163 |
| JP | 2019091334 A5 | * | 11/2017 | ............ G06F 21/32 |
| JP | 2019-91334 A | | 6/2019 | |
| JP | 2015-185422 A | | 9/2019 | |
| JP | 2019165422 A | * | 9/2019 | ............ G06F 16/44 |
| KR | 10-2015-0106229 A | | 9/2015 | |
| KR | 10-2018-0009275 A | | 1/2018 | |
| WO | WO 2008/134135 A2 | | 11/2008 | |
| WO | WO 2016/076641 A1 | | 5/2016 | |
| WO | WO 2018/079852 A1 | | 5/2018 | |

OTHER PUBLICATIONS

Varshney "Identifying Smartphone Users Based on Smartwatch Data," Thesis, Jan. 2017, pp. 1-73 (Year: 2017).*

(56) References Cited

OTHER PUBLICATIONS

JP2016110368 Machine Translation (Year: 2016).*
JP2017027594 Machine Translation (Year: 2017).*
JP2019091334 Machine Translation (Year: 2019).*
JP2019165422 Machine Translation (Year: 2019).*
JPWO2018079852 Machine Translation (Year: 2018).*
Enamamu et al "Smartwatch based Body-Temperature Authentication," ICCNI 2017: International Conference on Computing, Networking on Informatics (IEEE), pp. 1-7 (Year: 2017).*
Enamamu et al "Smartwatch based Body-Temperature Authentication," ICCNI 2017: International Conference on Computing, Networking and Informatics (IEEE), pp. 1-7 (Year: 2017).*
Vhaduri et al "Multi-Modal Biometric-Based Implicit Authentication of Wearable Device Users," IEEE Transactions on Information Forensics and Security, vol. 14, No. 12, Dec. 2019, pp. 3116-3125 (Year: 2019).*
Japanese Office Action dated Nov. 2, 2021 in Japanese Patent Application No. 2020-193064, 3 pages.
European Search Report dated Jun. 15, 2020 in European Application 19214192.7 filed Dec. 6, 2019 (with English Translation of Categories of Cited Documents), 4 pages.

* cited by examiner

US 11,621,956 B2

METHOD FOR SECURELY CONNECTING A WATCH TO A REMOTE SERVER

CROSS-REFERENCE TO RELATED APPLICATION

This application claims priority to European Patent Application No. 19214192.7 filed on Dec. 6, 2019, the entire disclosure of which is hereby incorporated herein by reference.

TECHNICAL FIELD

The present invention relates to a method for securely connecting a watch to a remote server and a system implementing such a method.

The invention also relates to a computer program.

PRIOR ART

A watch comprises a set of functions that can be used by the wearer. Such functions can allow access to remote servers implementing service provisions such as banking provisions, commercial provisions (online shops, e-commerce companies), electronic messaging or instant messaging provisions. In such a context, the wearer of the watch must manage and store an increasing number of identifiers, passwords and access codes which are authentication elements. Such authentication elements are often to be worn by the wearer when they must initiate a connection to a remote server in order to benefit from a service provision. For this purpose, it is common that the wearer, failing to memorise all these confidential data, prefers to group them together on paper or else in a standard computer file of the spreadsheet type archived on media allowing the storage of digital data, whether hard disks, flash memory, a USB key, etc. This situation has the disadvantage that the documents/files containing these authentication elements can be stored in an environment with little or no protection. This introduces a significant security flaw in the management of authentication elements.

Under these conditions, it is understood that there is a need to find an alternative solution, in particular which does not have the disadvantages of the prior art.

SUMMARY OF THE INVENTION

A purpose of the present invention is therefore to provide a method for securely connecting a watch to a remote server which is reliable and robust.

To this end, the invention relates to a method for securely connecting a watch to a remote server of a service provider including the following steps:
  authenticating the wearer of the watch authorising access to use the functions of this watch, and
  selecting one of said functions from an input interface of said watch aiming at establishing a connection between said watch and the remote server;
  identifying the wearer of the watch from at least one biometric information element comprised in a portion of this wearers skin;
  transmitting to the remote server an authentication element relating to the selected function once the wearer is identified, and
  carrying out an authentication of the wearer by the remote server from said authentication element in order to authorise an exchange of data between the watch and this remote server.

In other embodiments:
  the transmission step comprises a sub-step of selecting the authentication element relating to said selected function in anticipation of its sending to the remote server, among the authentication elements archived in the memory elements of the processing unit of the watch;
  the step of carrying out an authentication comprises a sub-step of comparison between the authentication element received from the watch and a reference authentication element archived in the server;
  the identification step comprises a sub-step of acquiring by at least one multispectral biometric skin sensor comprised in the watch, a plurality of images of a portion of the wearer's skin adjacent to said sensor, said images comprising said at least one biometric information element comprised in this skin portion;
  the identification step comprises a sub-step of generating a digital identification element from said at least one biometric information element comprised in the acquired images of the skin portion;
  the identification step comprises a sub-step of validating a digital identification element generated in anticipation of the identification of the wearer;
  the biometric information element is related to a vascular network or to a texture of this skin.

The invention also relates to a system for securely connecting a watch to a remote server implementing such a method, the watch comprising the following elements connected together: a processing unit, a multispectral biometric skin sensor, an input interface, an interface for broadcasting a visual piece of information and a wireless communication interface for data exchanges with said remote server.

The invention also relates to a computer program comprising program code instructions for executing the steps of this method when said program is executed by the processing units of a watch and of a remote server.

BRIEF DESCRIPTION OF THE FIGURES

Other features and advantages will emerge clearly from the description which is given below, in an indicative and non-limiting manner, with reference to the appended figures, wherein.

DETAILED DESCRIPTION OF THE INVENTION

Figure 1:
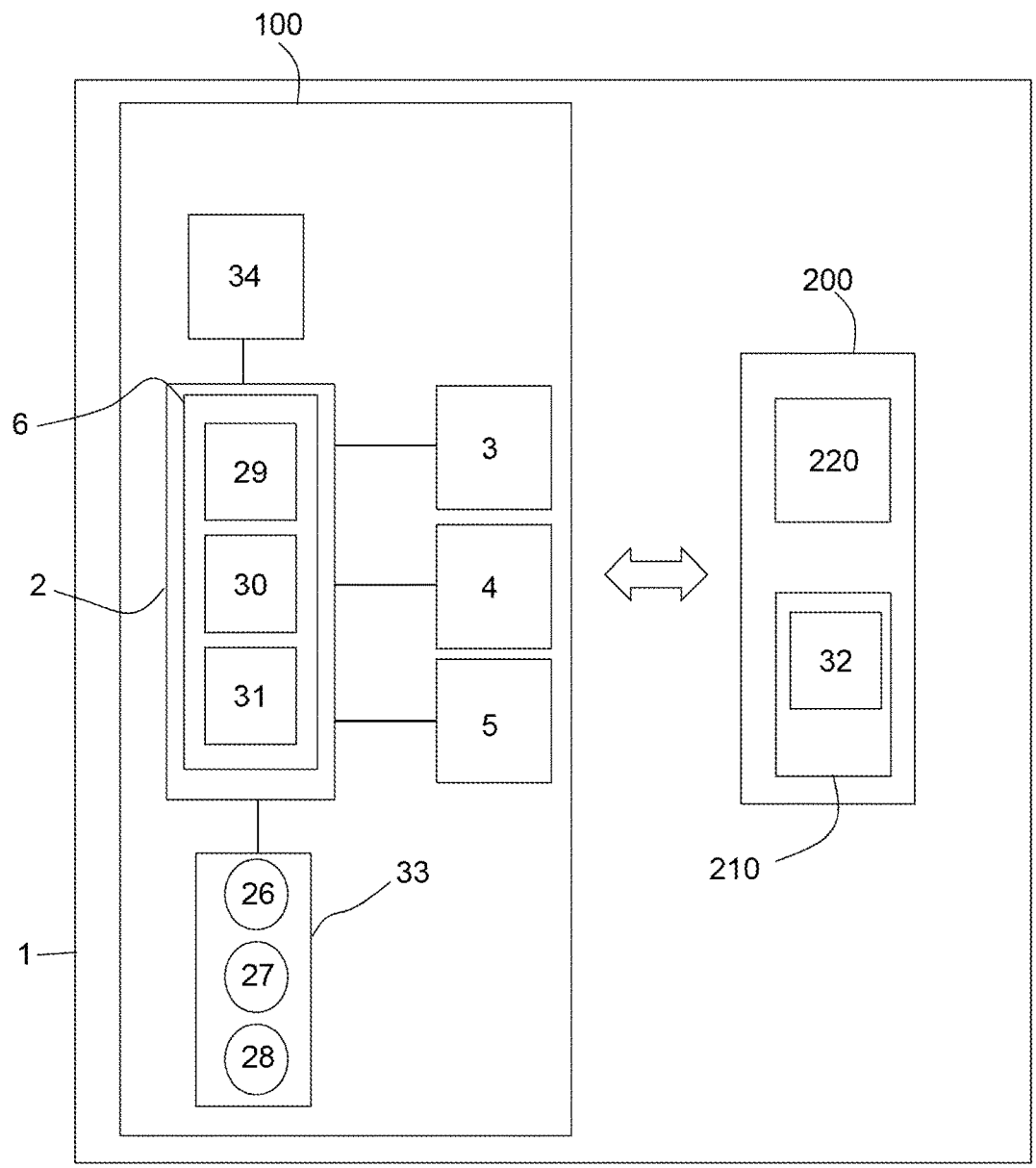
FIG. 1 is a schematic representation of a system for securely connecting a watch to a remote server, according to one embodiment of the invention.

FIG. 1 shows a system 1 for securely connecting a watch to a remote server 200. In this system 1, the watch 100 is preferably a mechanical watch 100 connected to a hybrid display. In this context, the watch 100 comprises a body such as a watch case, and an attachment element such as a wristlet allowing to fasten this body, for example to the wrist of the wearer. This watch 100 more specifically comprises in a non-limiting and/or non-exhaustive manner:
  a processing unit 2 including hardware and software resources, in particular at least one processor cooperating with memory elements 6;
  an interface for broadcasting a visual piece of information 3 such as a hybrid display dial provided with a first analogue display component and a second digital and/or alphanumeric display component;

an interface for broadcasting an audio piece of information 4 such as a loudspeaker;

a wireless communication interface 5 (for example cellular, WLAN Bluetooth, etc.);

an input interface 34 such as a keyboard or even a touch interface comprised for example in the interface for broadcasting a visual piece of information 3, and a multispectral skin biometric sensor 33 comprising at least one photographic sensor 26, at least one multispectral illumination source 27 and at least one thermal image sensor 28, the illumination source 27 being able to emit light radiation in wavelengths comprised between 300 and 1100 nm, in addition this illumination source 27 can be of the laser type.

In this watch 100, the processing unit 2 is connected, among others, to the interfaces for broadcasting a visual and sound piece of information 3, 4, to the input interface 34 as well as to the wireless communication interface 5 and to the multispectral biometric sensor 33. It will also be noted that the multispectral biometric sensor 33 is arranged in the body of the electronic device 100 and/or in the attachment element.

In this system 1, the server 200 comprises a processing unit 210 and a communication interface 220. This server 200 is a remote server of a service provider, for example a server of a banking or commercial service provider (online shops, e-commerce companies), electronic messaging or instant messaging provisions. In this context, the processing unit 210 of this server 200 comprises memory elements including a reference authentication element 32. This reference authentication element 32 is capable of participating in the creation of a secure connection between the remote server 200 and said watch 100 and can comprise keys, certificates, authentication codes, passwords and personal codes, etc.

This watch 100 is capable of ensuring the identity control of the authenticated wearer discreetly, that is to say without direct intervention/interaction of the wearer with this watch 100, so that they can make a connection to a remote server 200 all the time they wear it. The identification of the wearer is then carried out in a transparent and discreet manner, based on at least one biometric information element comprised in the skin of this wearer, such as the vascular network of the skin or the texture of this skin. This skin of the wearer which covers their body has a particularity, not usually taken into account by the person skilled in the art because it is not naturally visible to the human eye, related to the features of absorption and reflection at different wavelengths (spectrum) of the components of the skin, located at different depths. In a simplified model, the skin consists of a layer called "epidermis", which is semi-transparent and located on the surface then, under the epidermis, of a layer called "dermis" and comprising, among others, the blood vessels (or vascular network) wherein the haemoglobin is highly reflective at high wavelengths close to red, being for example comprised between 760 and 930 nm, which allows here to reveal or show the vascular network of the wearer's skin. In other words, the light absorption spectrum of the components of the epidermis and the dermis constituting the skin not being uniform according to the electromagnetic wavelengths, the appearance and the colour of the skin result from a complex combination of these phenomena. Thus, when it comes to showing or revealing a biometric information element such as the texture of the skin of this wearer, a texture essentially formed of cracks or cavities, the illumination of the skin can then be ensured by an illumination source restricted to wavelengths around red which tends to make the shadow phenomenon disappear from the bottom of the cracks. Indeed, there is a retro projection effect by reflection on the dermis and through the epidermis of these wavelengths close to red, while the illumination of the skin by a source of colour spectrum far from red, typically the wavelength band located between violet (400 nm) and up to yellow-orange (600 nm), on the contrary allows to strongly contrast these cracks in the skin by the appearance of shadows at the bottom of these cracks. It should be noted that the identification of a biometric information element comprised in the skin can be improved by the use of the thermal image sensor 28, preferably without illumination. By way of example, for showing the texture of the skin, in particular when the concerned portion of the skin of this wearer is provided with hair, the use of the thermal image sensor 28 allows to reveal the cracks of this texture of the skin which are generally warmer than the surrounding skin and the hair colder than the surrounding skin. Thus, in this configuration, the hair can be thermally distinguished from cracks in the texture of the skin due to this difference between their respective temperatures.

It should be noted that the capture of thermal images can be carried out under illumination in a given wavelength depending on the biometric information element that should be shown or revealed.

It is therefore understood, according to the principle of the invention, that the identification of the wearer is carried out on the basis of at least one biometric information element comprised in images of a portion of the skin of this wearer which can be illuminated, where appropriate, according to different wavelengths in order to capture images comprising the desired biometric information element. Thus, this biometric information element, comprised in these images, can be shown by the illumination performed in different wavelengths or without illumination, for example when it comes to capturing thermal images.

In this watch, the memory elements 6 of the processing unit 2 of the watch 100 comprise data relating to authentication elements 31 specific to each remote server 200 to which the watch 100 is connected. In other words, these authentication elements are specific to the wearer and/or to the watch 100, and thus allow the wearer to connect to the server 200 he wishes by means of a selection of a function of the watch 100. These memory elements 6 also include digital image processing algorithms 29 allowing to characterise at least one biometric information element relating to the wearer's skin and which is comprised in the images relating to the portion of the wearer's skin. These memory elements 6 also include algorithms 30 for generating the reference digital identification element but also a digital identification element.

Figure 2:
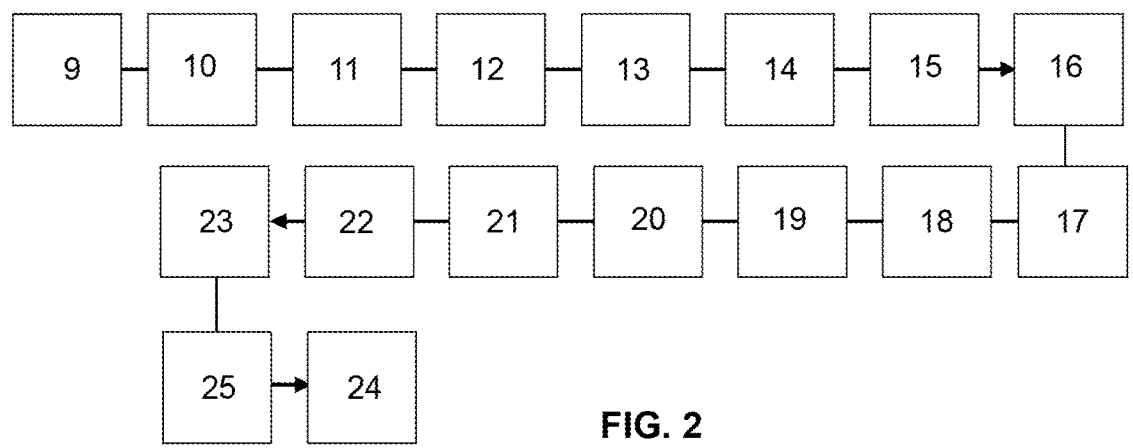
FIG. 2 is a flowchart relating to a method for securely connecting the watch to the remote server, according to the embodiment of the invention.

The system 1 is capable of implementing a method for secure connection to the remote server 200 of a service provider, shown in FIG. 2. Such a server 200 of a service provider can be for example a server of banking or commercial service provider (online shops, e-commerce companies), electronic messaging or instant messaging provisions.

This method comprises a step 9 of authenticating the wearer of the watch 100 authorising access to use the functions of this watch 100. This authentication step 9 therefore allows to identify with certainty the wearer of the watch so that he can have access to use all the functions of this watch 100. In other words, it allows the wearer to provide proof of his identity by providing for the input of an authentication code or a secret code by means of an interaction between the wearer and the input interface 34.

In addition, it is understood that the functions can be implemented by computer programs executed by the processing unit 2 of the watch 100 as soon as these programs are activated/selected following an interaction between the wearer and the input interface 34 of this watch 100. These computer programs thus executed allow the wearer to benefit from service provisions, for example of the banking, commercial type or else instantaneous or electronic messaging.

Following this authentication step 9, the method comprises a step 11 of selecting one of said functions from the input interface 34 of said watch 100 aiming at establishing a connection between said watch 100 and the remote server 200. It will be understood that the functions can be implemented by computer programs executed by the processing unit 2 of the watch 100 as soon as these functions which are displayed on/in the interface for broadcasting a visual piece of information 3, are activated/selected after an interaction between the wearer and the input interface 34 of this watch 100. These computer programs thus executed allow the wearer to benefit from service provisions for example of the banking, commercial or else instant or electronic messaging.

The method then comprises a step 12 of identifying the wearer of the watch 100 from at least one biometric information element comprised in a portion of the wearer's skin. Such a step 12 is carried out systematically following the selection of a function in order, in particular, to allow the processing unit 2 to control that the wearer of the watch 100 is still in possession of the latter and that they are indeed at the origin of the selection of the function. This step 12 comprises a sub-step 13 of acquiring, by the sensor 33, a plurality of images of a portion of the wearer's skin, said skin portion being arranged in an adjacent manner to said sensor 33, said images comprising said at least one biometric information element comprised in this skin portion. This sub-step 13 comprises a phase of illuminating 14 the skin portion according to different wavelengths. More specifically, during this phase 14, the processing unit 2 drives the multispectral biometric sensor 33 and in particular the illumination source 27 so that the latter emits light radiation in the direction of the skin portion according to a precise wavelength adapted for showing or revealing said at least one biometric information element specific to the skin which is sought here. Once the illumination has been configured, the acquisition sub-step 13 comprises a phase 15 of capturing images of this skin portion illuminated at least at one wavelength capable of showing or revealing said at least one biometric information element. During this phase 15, the processing unit 2 drives the multispectral biometric skin sensor 33 and in particular the photographic sensor 26 synchronously with the activation/deactivation of the illumination source 27 at a given wavelength in order to capture at least one image relating to the skin portion illuminated for at least one wavelength.

This acquisition sub-step 13 can also comprise a phase 16 of capturing at least one thermal image of the skin portion. Such a phase 16 is preferably carried out without illumination but in other alternatives illuminating the portion can be carried out at least at one given wavelength, this is obviously depending on the biometric information element that should be shown or revealed. This phase 16 can be carried out before or after the illumination 14 and image capture 15 phases.

The identification step 12 then comprises a sub-step 17 of generating the digital identification element from said at least one biometric information element comprised in the acquired images of the skin portion. Such a sub-step 17 comprises a phase 18 of characterising said biometric information element comprised in the images relating to said skin portion. During this phase 18, the processing unit 2 implements algorithms 29 for processing acquired images aiming at identifying/detecting in each of them said at least one biometric information element that they comprise. As already mentioned previously, it may be information elements relating, for example, to the texture of the skin or to the vascular network comprised in this portion of the wearers skin. The implementation of these algorithms 29, 30 by the processing unit 2 can, by way of example, provide for a process of cutting these images into segments. It is understood here that each acquired image gives an overall view of the portion of the wearers skin, and then includes areas of varying relevance for the identification of said at least one biometric information element. Such a cutting process participates in extracting the segments to be processed and in eliminating the parts not to be processed in these images. These algorithms 29 can then provide an indexing of these image segments comprising features relating to said at least one particular biometric information element to be identified, by localisation areas in the skin portion, in order to be able to assign to each area the adequate processing regarding the morphological typology of the feature of this geographical area of the portion. In this context, these algorithms 29 process each segment of these images by showing the pieces of information carried by the pixels of each of these images by performing image analysis operations of the processing, transformation and detection type. Subsequently, these algorithms 29 perform feature filtering and extraction or vectorisation operations, in order to convert the image data relating to said at least one identified and extracted biometric information element, into parametric data, typically relative numerical values expressed for example as an index or as a percentage.

It is understood here that the acquisition of several images representing the same skin portion under different illuminations or without illumination, helps to improve the precision and efficiency of this characterisation phase 18.

Subsequently, the generation sub-step 17 comprises a phase 19 of designing the digital identification element from the characterisation of said at least one biometric information element. During this phase 19, the processing unit 2 implements algorithms for generating 30 such a digital identification element specifically provided for the processing of the parametric data obtained during the characterisation phase 18, which parametric data being relating to said at least one biometric information element.

Then, the identification step 12 comprises a sub-step 20 of validating the digital identification element generated in anticipation of a control of the identity of the wearer. This validation sub-step 20 comprises a comparison phase 21, implemented by the processing unit 2, between the generated digital identification element and the reference digital identification element. In this method, the reference digital identification element can be created, once the wearer has been duly authenticated and their identity is certain, during a step 11 of defining this reference digital identification element providing sub-steps similar to the acquisition 13 and generation 17 sub-steps implemented during the identification step 12. In this method, once the wearer of the watch 100 is authenticated, the processing unit 2 implements this definition step 11 and then performs an archiving of the reference digital identification element obtained in the memory elements 6 of the processing unit 2. This reference digital identification element can therefore be determined automatically by the processing unit 2 or configured by the wearer during an adjustment process aiming at guiding the wearer in defining this reference digital identification element.

This comparison phase 21 comprises a sub-phase of rejecting the identification of the wearer 22 if the generated digital identification element is substantially different or different from the reference digital identification element. In this case, the establishment of the connection to the remote server is suspended or even removed. In addition, access to the watch 100 is also removed and in particular the access to the functions of this watch. In this context, the wearer of the watch is invited to authenticate themself again in order to provide proof of their identity by inputting an authentication code or a secret code, by means of an interaction between the wearer and the input interface 34. Indeed, the wearer and owner of the watch 100 may no longer be in possession thereof.

The comparison phase 21 also comprises a sub-phase of successfully identifying the wearer if the generated digital identification element is substantially similar or similar to the reference digital identification element. In this case, the method then provides for the implementation of a step 22 of transmitting to said remote server 200 the authentication element relating to the selected function once the wearer is identified. This step 22 comprises a sub-step 23 of selecting the authentication element relating to said selected function in anticipation of its sending to the remote server 200. During this sub-step 23, the selected function is identified, and on the on the basis of this identification, a selection of the authentication element is carried out from the authentication elements archived in the memory elements 6 of the processing unit 2 of the watch 100. As already mentioned previously, the authentication elements 31 may be keys, certificates, authentication codes, passwords and personal codes which are each dedicated to the authentication of the wearer of the watch 200 to the corresponding service provider and therefore to the remote server comprised in a technical platform of this provider. It is understood here that the authentication element is dedicated to authenticating the wearer to a remote server of a given service provider. In addition, the authentication elements are archived in the memory elements 6 of the processing unit 2 of the watch 100, each being associated with a digital identification element of a corresponding function.

The method then comprises a step of performing an authentication 24 of the wearer by the remote server 200 from said authentication element in order to authorise an exchange of data between the watch 100 and this remote server 200. Such a step 24 comprises a comparison sub-step 25, carried out by the processing unit 210 of the server 200, between the authentication element received from the watch and a reference authentication element 32 archived in the server 200. This comparison sub-step 25 comprises a phase of rejecting the identification of the wearer 22 if the authentication element is significantly different or different from the reference authentication element 32. In this case, the establishment of the connection to the remote server 200 is suspended or even removed.

The comparison sub-step 25 also comprises a phase of successfully identifying the wearer if the authentication element is substantially similar or similar to the reference authentication element 32. In this context, an exchange of data between the watch 100 and this remote server 200 in connection with the service provision is then authorised.

Thus, the invention allows the wearer and owner of the watch 200 to be able to be authenticated with all the remote servers of the service providers based on only their identification from at least one biometric information element comprised in a portion of their skin, without having to directly enter the authentication element specific to each of these servers 200 in order to be able to authenticate themself to the corresponding service provider. It is therefore understood that this automatic and non-intrusive identification allows the wearer to be able to connect their watch to all the remote servers each in connection with a function of the watch relating to a service provision.

The invention also relates to a computer program comprising program code instructions for executing steps 10 to 25 of this method when said program is executed by the processing unit 2 of the watch 100.

The invention claimed is:

1. A method for securely connecting a watch to a remote server of a service provider including the following steps:
authenticating the wearer of the watch authorizing access to use the functions of said watch, and
selecting one of said functions from an input interface of said watch aiming at establishing a connection between said watch and the remote server;
acquiring by at least one multispectral biometric skin sensor comprised in the watch, a plurality of images of a portion of the wearer's skin adjacent to said sensor while illuminating the skin portion, and at least one thermal image of the skin region without illuminating the skin portion, said images comprising said at least one biometric information element comprised in said skin portion;
identifying the wearer of the watch from by generating a digital identification element from said at least one biometric information element comprised in the acquired images of the skin portion that include the plurality of images acquired while illuminating the skin portion and the at least one thermal image of the skin region acquire without illuminating the skin portion, the generating including cutting the acquired images into segments, extracting certain segments to be processed and eliminating certain segments not to be processed;
transmitting to said remote server an authentication element relating to the selected function once the wearer is identified, and
carrying out an authentication of the wearer by the remote server from said authentication element in order to authorize an exchange of data between the watch and said remote server,
wherein the biometric information element is related to a vascular network or to a texture of this skin.

2. The method according to claim 1, wherein the transmitting step comprises a sub-step of selecting the authentication element relating to said selected function in anticipation of its sending to the remote server, among the authentication elements archived in the memory elements of the processing unit of the watch.

3. The method according to claim 1, wherein the step of carrying out an authentication comprises a sub-step of comparison between the authentication element received from the watch and a reference authentication element archived in the server.

4. The method according to claim 1, wherein the identifying step comprises a sub-step of validating the digital identification element generated in anticipation of the identification of the wearer.

5. A system for securely connecting a watch to a remote server implementing the method according to claim 1, the watch comprising the following elements connected together: a processing unit, a multispectral biometric skin sensor, an input interface, an interface for broadcasting a visual piece of information and a wireless communication interface for data exchanges with said remote server.

6. A non-transitory computer-readable medium that stores program code instructions for executing the steps of the method according to claim 1 when said instruction are executed by processing circuitry of a watch and of a remote server.

\* \* \* \* \*